United States Patent [19]
Bizjak et al.

[11] Patent Number: 5,434,722
[45] Date of Patent: Jul. 18, 1995

[54] DUAL INTERFACE FOR DISK DRIVES

[75] Inventors: John F. Bizjak, San Jose; Lindell M. Wilson, San Carlos, both of Calif.

[73] Assignee: Brier Technology Inc., San Jose, Calif.

[21] Appl. No.: 228,928

[22] Filed: Apr. 18, 1994

Related U.S. Application Data

[63] Continuation of Ser. No. 611,273, Nov. 9, 1990, abandoned.

[51] Int. Cl.⁶ ............................................. G11B 19/12
[52] U.S. Cl. ................................... 360/69; 360/73.03
[58] Field of Search ................. 360/73.03, 69, 63, 64, 360/77.02, 78.04, 78.05, 61; 395/425

[56] References Cited

U.S. PATENT DOCUMENTS

| | | | |
|---|---|---|---|
| 3,623,006 | 11/1971 | Balakian et al. | 395/425 |
| 3,950,735 | 4/1976 | Patel | 395/275 |
| 4,007,493 | 2/1977 | Behr et al. | 360/77.07 |
| 4,414,590 | 11/1983 | Merdian, Jr. et al. | 360/77.02 X |
| 4,500,933 | 2/1985 | Chan | 360/69 |
| 4,581,663 | 4/1986 | Tanaka | 360/77.07 X |
| 4,644,418 | 2/1987 | Banno et al. | 360/39 |
| 4,644,419 | 2/1987 | Iinuma et al. | 360/46 |
| 4,656,533 | 4/1987 | Sakai et al. | 360/77.03 X |
| 4,773,036 | 9/1988 | Berens et al. | 395/425 |
| 4,803,571 | 2/1989 | Fujioka et al. | 360/63 |
| 4,809,095 | 2/1989 | Ushiro | 360/64 X |
| 4,858,038 | 8/1989 | Kazama | 360/69 |
| 4,897,746 | 1/1990 | Saito | 360/118 |
| 4,928,192 | 5/1990 | Bartlett et al. | 360/77.08 |
| 4,933,795 | 6/1990 | Nigan | 360/121 |

FOREIGN PATENT DOCUMENTS

| | | |
|---|---|---|
| 0110050 | 6/1984 | European Pat. Off. |
| 0167879 | 1/1986 | European Pat. Off. |
| 3412454 | 10/1984 | Germany |
| 58-169366 | 10/1983 | Japan |

OTHER PUBLICATIONS

Patent Abstracts of Japan, vol. 9, No. 141 (P-364) (1864) Jun. 15, 1985 Pat. No. JP-A-60 202 361, Date: Feb. 01, 1985, Applicant: Nippon Denki K.K.
Miller, Byron, "The Inside Story on Hard Drive Standards" Jun. 1992 *Radio Electronics,* pp. 63–66.
Patent No. JP-A-60 202 361, Date: Feb. 01, 1985, Applicant: Nippon Denki K.K.

*Primary Examiner*—Aristotelis Psitos
*Assistant Examiner*—James T. Wilson
*Attorney, Agent, or Firm*—Hecker & Harriman

[57] ABSTRACT

A disk drive that can read from and write to both standard floppy disks and high capacity floppy disks. The present invention provides a single slot disk drive that can accept both standard floppy disks and high capacity floppy disks. After a floppy disk is inserted, physical cues on the floppy disk are used to inform the disk drive as to the nature (standard or high capacity) of the inserted disk. The disk drive incorporates two interfaces, a standard floppy disk controller and an IDE interface for high capacity disks. The disk drive is configured so that both interfaces can communicate with a host computer at all times, regardless of what type of disk is inserted in the disk drive. This allows the host computer to operate as if it had two separate disk drives available.

14 Claims, 4 Drawing Sheets

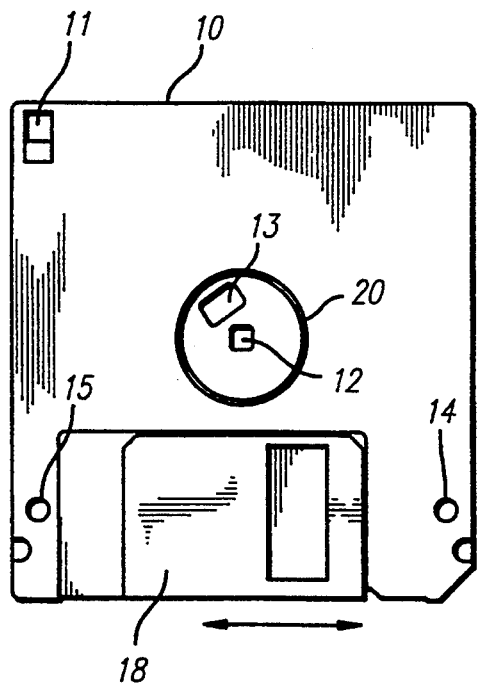
FIG. 1A
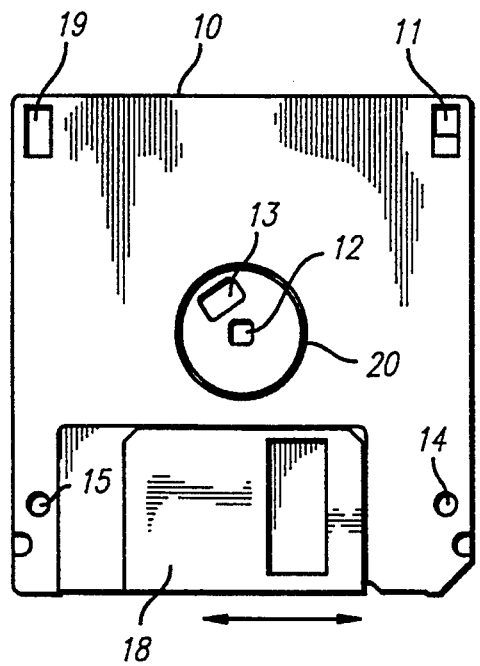
FIG. 1B
FIG. 3
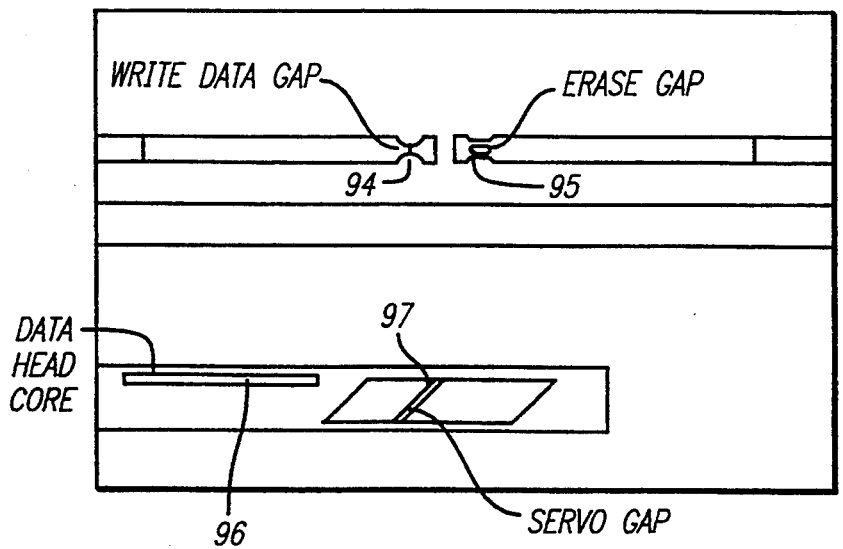

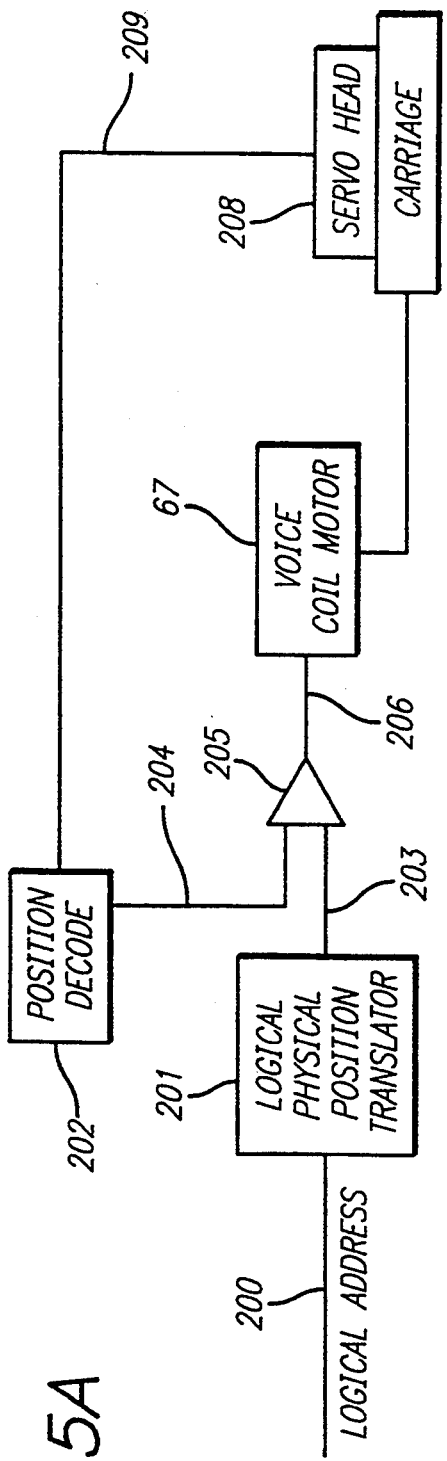
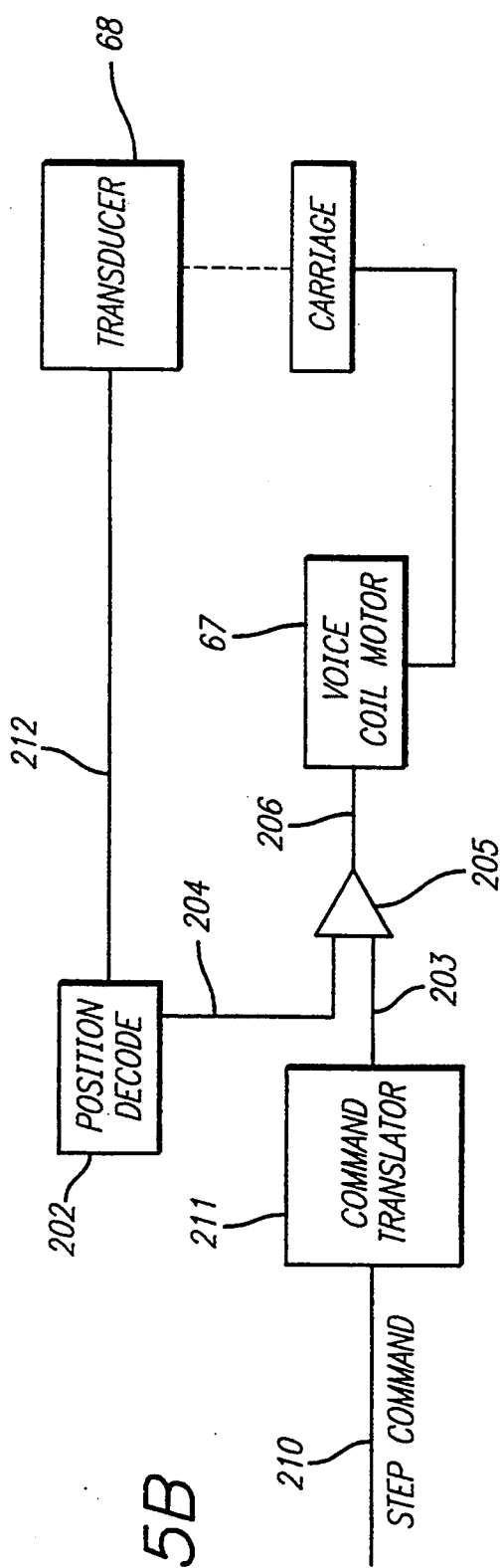
FIG. 5A
FIG. 5B

DUAL INTERFACE FOR DISK DRIVES

This is a continuation of application Ser. No. 611,273 filed Nov. 9, 1990, now abandoned.

BACKGROUND OF THE INVENTION

1. FIELD OF THE INVENTION

This invention relates to the field of disk drives, and in particular to a flexible media disk drive that can read and write data onto both low and high density flexible media disks, with two separate interfaces provided for standard and high capacity disks.

2. Background Art

Mass storage for computer or other information systems is typically provided by magnetic media storage systems such as rigid or flexible disk storage systems. A rotating disk having a magnetic media layer on the surface is accessed by a "read/write" head that is used to store and retrieve information from the disk surface. To store information on a magnetic media disk, flux transitions are induced in the magnetic particles embedded in the surface of the disk. When a magnetic read/write head is passed over the flux reversals, a signal is induced in the head that can be decoded to provide information, such as data or position signals.

Typically, data is stored on a magnetic disk in a series of spiral or concentric "tracks" on the surface of the disk. The read/write head moves back and forth radially on the disk so that it can be selectively positioned over one of the tracks. Once in position over a track, the head remains in place as the track rotates circumferentially beneath it, allowing the head to read or write data on the track.

Flexible media disk drive systems, also known as "floppy disk drives" or "floppy drives" are often utilized by computer users to provide random access memory. In a floppy drive, the flexible magnetic media is enclosed in a protective enclosure. An opening in the enclosure is protected by a sliding cover. When the enclosure is inserted into a disk drive, the protective cover slides back, exposing the flexible media to a pair of read/write heads disposed on opposite sides of the disk. Advantages of floppy drives include low cost media and portability. Data security is also an advantage of floppy drives because sensitive material can be written onto a floppy disk, and then removed from the drive as desired. One prior art disadvantage of floppy drives is the limited storage capacity.

Prior art floppy drives typically have been limited to one, two or four megabytes of capacity. As a result, many computer users rely on rigid media disk drives, also known as "hard disk drives" or "Winchester" disk drives, to provide greater storage capacity. Modern disk drives are capable of storing, for example, gigabytes of data, although more popular capacities used in personal computer contexts range from 20 to 360 megabytes. Hard disk drives have fixed media; that is, the media cannot practically be removed from the drive in ordinary use. In addition, rigid media hard disk drives typically are more costly than floppy disk drives.

One scheme to provide a system that combines the portability of floppy disks with the storage capacity of hard disk drives is implemented in the form of a high capacity floppy disk drive as described in U.S. Pat. No. 5,003,412 issued on Mar. 26, 1991 and entitled "Method and Apparatus for Positioning a Read/Write Mechanism" and assigned to the assignee of the present patent application. This patent application is incorporated herein by reference. This patent application describes a novel servo pattern that allows the number of data tracks that can be defined on a flexible media disk to be greatly increased over standard floppy disk drive schemes. This permits implementation of a floppy disk drive that is capable of storing, for example, 25 or more megabytes of data on a single floppy disk.

For purposes of this patent application, a "standard disk drive" refers to a floppy disk drive that can read and write floppy disks with unformatted capacity of one, two or four megabytes of data. A "standard floppy disk" refers to a floppy disk with unformatted capacity of one, two, or four megabytes of data. A "high capacity floppy drive" refers to a floppy disk drive that can read and write floppy disks formatted for 25 or more megabytes of data. A "high capacity floppy disk" refers to a floppy disk formatted for 25 or more megabytes of data.

Both the high density drive and the standard floppy disk drive referred to herein generally use a 3½" floppy disk form factor, although such drives may use alternate form factors. The floppy disks of the high capacity floppy drive are formatted, however, to store 25 or more megabytes of data as opposed to the one, two, or four megabytes of data of standard floppy disk drives.

Standard floppy disk drives communicate with a host computer system through an interface. This interface is referred to as the "floppy disk interface" and is implemented with a "floppy disk controller." In the prior art, this interface is implemented by inserting an FDC (floppy disk controller) card into a PC-AT bus expansion slot in an IBM or IBM-compatible computer. The FDC card performs the following functions: analog data separator, write precompensation, clock generator, data rate selection and host/drive interface driver/receiver.

A typical high capacity disk drive (example, "winchester" or "hard disk") communicates with a computer system host through a PC/AT bus interface known as the IDE (Integrated Device Electronics) interface. Other industry standard interfaces such as an SCSI (small computer system interface) are commonly used for high capacity disk drive communication as well. The IDE interface is an industry standard interface between computer systems compatible with the IBM model PC/AT computer and many typical hard disk drives. High capacity floppy disk drives can communicate through the IDE interface since their performance and capacity is similar to a hard disk drive.

It is desired to provide a single disk drive that can read from and write to both standard floppy disks and high capacity floppy disks and appear to the host computer as a hard disk with removable media. A computer user who desires to use both types of disks requires separate disk drives compatible with each respective type of floppy disk. This has a number of disadvantages, including the added cost of multiple disk drives, the dedication of expansion capabilities of a .computer system to two devices performing substantially the same function, and the requirement that two different interfaces be implemented.

Therefore, it is an object of the present invention to provide a single disk drive that can read from and write to both standard and high capacity floppy disks.

It is another object of the present invention to provide a disk drive that implements both a floppy disk interface and a IDE interface.

It is another object of the present invention to provide a dual interface disk drive that appears as two different disk drives to a host computer system.

It is another object of the present invention to provide a drive that can be adapted to a standard PC/AT host computer system with no change to the host software or hardware to support the standard floppy.

It is another object of the present invention to provide a means whereby two disimilar interfaces are active concurrently and have access to the same peripheral (floppy disk drive).

It is yet another object of the present invention to provide a means whereby a voice coil motor (actuator) used in a high capacity floppy disk drive can be "transformed" into the equivalant of a stepper motor drive (standard capacity floppy disk drive).

SUMMARY OF THE PRESENT INVENTION

A disk drive that can read from and write to both standard floppy disks and high capacity floppy disks is described. The present invention provides a single disk drive, that can accept both standard floppy disks and high capacity floppy disks. After a floppy disk is inserted, physical cues on the floppy disk are used to inform the disk drive about the characteristics (standard or high capacity) of the inserted disk. The disk drive incorporates two interfaces, a standard floppy disk interface and a IDE interface for high capacity disks. The disk drive is configured so that both interfaces can communicate with a host computer at all times, regardless of what type of disk is inserted in the disk drive. This allows the host computer to operate as if it had multiple disk drives available for reading and writing from disks of different capacities.

Once the type and capacity of the disk has been determined, a motor controller is notified so that the appropriate rotation speed of the motor is implemented. In the preferred embodiment of this invention, standard floppy disks rotate at 300 rpm and high capacity disks rotate at 720 rpm. Other disk rotation speed combinations are possible as well. This is accomplished by changing timing signals that are provided to the spindle motor of the disk drive.

The invention also implements a special "multi-core" head that can read and write from both standard floppy disks and high capacity disks. The cores are coupled to appropriate read, write, and servo channels. Depending on the disk that is inserted in the disk drive, the appropriate core is enabled and reading and writing from the disk can be initiated. In this invention, positioning of a high capacity drive is implemented with a closed loop servo system. In standard floppy drive mode, a special positioning system is used to convert the open loop positioning scheme of prior art floppy disk interface to a closed loop relative positioning scheme with track crossing information provided to the head positioning apparatus.

BRIEF DESCRIPTION OF THE DRAWINGS

FIG. 1A is a bottom view of a standard floppy disk.

FIG. 1B is a bottom view of a high capacity floppy disk.

FIG. 3 is a view of the multi-core head of the present invention.

FIG. 5A is a block diagram of the high capacity head positioning scheme.

FIG. 5B is a block diagram of the standard floppy head position scheme.

DETAILED DESCRIPTION OF THE INVENTION

Figure 2:
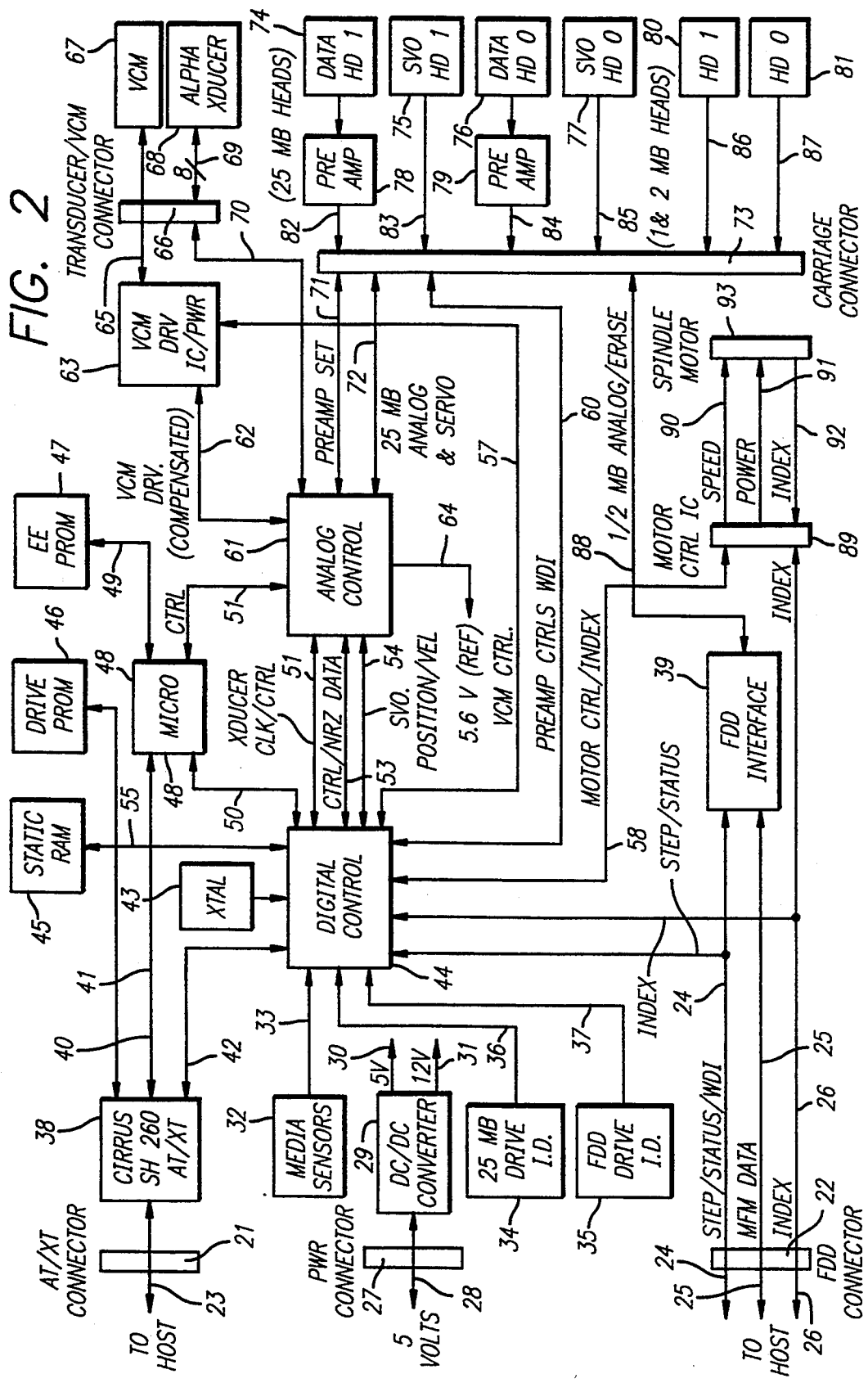
FIG. 2 is a detailed block diagram of the preferred embodiment of this invention.

A dual interface disk drive for reading from and writing to standard floppy disks and high capacity floppy disks is described. In the following description the numerous specific details, such as disk capacity, disk dimensions, disk rotation speed, disk capacity sensors, etcetera, are set forth in detail in order to provide a more thorough description of this invention. It will be apparent, however, to one skilled in the art, that the present invention may be practiced without these specific details. In other instances, well-known features have not been described in detail so as not to unnecessarily obscure the present invention.

The present invention is a single disk drive with a single slot for accepting floppy disks that can read from and write to both standard floppy disks and high capacity floppy disks. The disk drive internal control circuitry determines the type of disk (standard or high capacity) from physical cues associated with the disk. Standard and high capacity floppy disks are illustrated in FIGS. 1A and 1B respectively.

Referring to FIG. 1A, one side of a standard floppy disk is illustrated. The floppy disk 10 comprises a protective casing for protecting the flexible media within. The floppy disk includes a hub 20 that has an opening 12 for receiving the spindle of the disk drive spindle motor. Rotation of the spindle then causes the floppy disk media to rotate. An index hole 13 registers the disk with the spindle so that the occurrence of index is consistent for each floppy disk. This permits interchangeability of floppy disks in the drive. A sliding cover 18 covers an opening (not shown) in the protective casing. When the floppy disk is inserted in the disk drive, this sliding cover 18 is retracted, exposing the opening and the flexible media within. This permits read/write heads to access the flexible media. Detents 14 and 15 provide registration of the protective casing within the disk drive. A write protect opening 11 comprises an elongated slot with a sliding plug disposed therein. By positioning this sliding plug at one end or the other of the write protect slot 11, further writing onto the floppy disk can be prevented.

FIG. 1B illustrates a high capacity floppy disk. The high capacity floppy disk is substantially similar to the low capacity floppy disk with the exception of the second slot 19. When the high capacity floppy disk is inserted into the disk drive of this invention, detection of the second slot is used to indicate to the disk drive electronics and control system that a high capacity floppy disk is resident in the disk drive.

The present invention uses a multiple core read/write head instead which provides a dedicated standard floppy head structure and a dedicated high capacity floppy head structure. A view of this multi-core head is illustrated in FIG. 3. When the disk drive is in standard floppy drive mode, data is written to the disk and read from the disk using write data gap 94. Many standard floppy disk drives utilize a feature known as "tunnel erase" to reduce overwrite and adjacent track interference. Therefore, an erase gap 95 is also provided on the multi-core head of this invention to implement a tunnel erase scheme.

When the drive is in high capacity mode, data head core 96 is used to read and write data. In the high capacity mode, a closed loop servo positioning scheme is implemented and therefore, servo gap 97 is used to read servo information. In the preferred embodiment of the present invention, a "buried servo" scheme is implemented with servo information encoded on the lower portion of the magnetic media surface as described in U.S. patent application Ser. No. 07/269,558.

The multi-core head of the present invention provides information to separate data paths, one for high capacity operation and one for standard floppy operation. A block diagram of the preferred embodiment of this invention is illustrated in FIG. 4.

Figure 4:
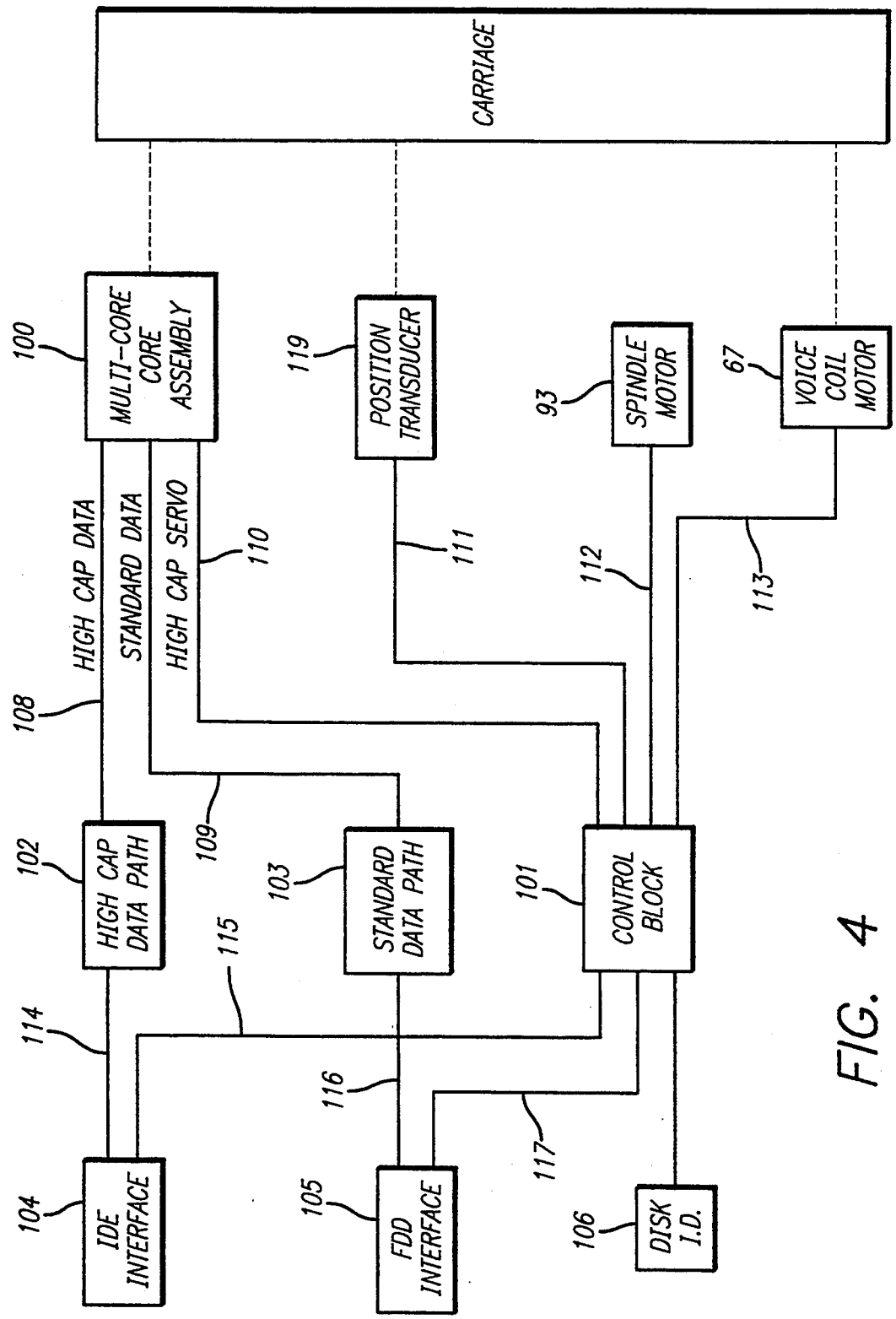
FIG. 4 is a block diagram of this invention.

Referring to FIG. 4 when in the high capacity drive mode, multi-core head assembly 100 provides high capacity data signals 108 to high capacity data path 102. The high capacity data path block 102 provides output signals 114 to IDE interface block 104 for communication with a host computer. The multicore head assembly 100 also provides high capacity servo information 110 to control block 101. Control block 101 provides head position control information signals 113 to voice coil motor 67.

Referring to FIG. 4 when in the standard floppy mode, head assembly 100 provides standard data signal 109 to standard data path block 103. Standard data path block 103 provides data signals 116 to FDD interface block 105 for communication to a host computer. Capacitive position transducer 119 provides standard position information signals 111 to control block 101. Control block 101 provides head position control information signals 113 to voice coil motor 67.

Disk ID block 106 scans inserted floppy disks to determine whether they are high capacity or standard floppy disks. The disk ID block 106 provides a disk ID signal 118 to control block 101 so that the appropriate outputs of head assembly 100 may be enabled. In the preferred embodiment of this invention, the standard floppy disk and high capacity disks are rotated at different rates. In this invention, the standard floppy disk is rotated at 300 rpm and the high capacity disk is rotated at 720 rpm. The control block 101 provides a spindle motor control signal 112 to spindle motor 93 depending on the output of the disk ID block 106. Based on the motor speed signals 112, spindle motor 93 rotates at 300 or 720 rpm. Control block 101 also provides status and control signals 115 and 117 to IDE interface 104 and FDD interface 105 respectively. Voice coil motor 67 is coupled to a carriage on which the read/write heads are mounted. This carriage is moved back and forth radially on the disk so that the heads may be positioned over appropriate data tracks. Capacitive position transducer 119 is also coupled to the carriage to provide head position information for use in the standard floppy mode.

The preferred embodiment of this invention is used with a computer system that employs both a FDD interface and a IDE interface, such as computers manufactured by IBM, or computers compatible with IBM computers. When a computer system employing the present invention is powered up or initialized, the computer system polls both interfaces to determine the presence or absence of a device at those interfaces. The present invention provides affirmative responses at both interfaces so that the computer system operates as if it had two separate disk drives available. Thus, the operation of this invention is transparent to standard computer operation and no modification of the host computer hardware is required to implement this invention.

As a result, there may be times when the host computer will attempt to communicate with one of the interfaces when the disk drive is configured for the other interface. For example, if a standard floppy disk is resident in the disk drive, the host computer may still wish to communicate with the IDE interface. The control block 101 of this invention receives status requests from the host computer through the interfaces 104 and 105. If communication with that interface is requested, the control block 101 determines which mode the disk drive is currently emulating. If the request is for the IDE interface and the disk drive is emulating a floppy disk drive, the control block returns a "busy" signal to the host computer and provides status information to the host software which reports that a standard capacity disk is installed and the drive is emulating a standard capacity floppy disk drive.

In prior art, standard floppy disk drives, a stepper motor is used to position the read/write heads over an appropriate track. This stepper motor system is an open loop system; that is, no position information feedback is provided to the control system. In the high capacity drive, a "voice coil" motor is used to position the read/write head carriage. The high capacity drive incorporates a closed loop servo system where buried servo signals are read to provide track position information. The servo information is used to generate position signals so that voice coil motor 67 can be used to accurately position the read/write heads. A voice coil motor is used instead of a stepper motor, because a stepper motor cannot accurately position the read/write heads in the high capacity mode. Because a voice coil motor is used, the open loop positioning scheme of prior art disk drives cannot be used directly. Therefore, the present invention uses a capacitive transducer carriage positioning scheme to provide head position information for use in the standard floppy mode. This position information is provided at signal 111 from the capacitive position transducer 119. The capacitive position transducer positioning system is described in co-pending application Ser. No. 07/611,248 filed on Nov. 9, 1990 and entitled "Capacitive Transducer Positioning Scheme" and assigned to the assignee of the present invention.

A block diagram illustrating the head positioning circuitry of the present invention in high capacity mode is illustrated in FIG. 5A. A logical address is provided to the disk drive from the host computer. The logical address 200 is provided to a logical to physical conversion block 201 which converts the logical address to a physical track and sector location on the disk surface. A servo head 208 detects position information from the surface of the disk and provides servo signals 209 to a position decode block 202. The position decode block 202 provides actual position signal 204 to comparator 205. The actual position 204 is compared to the desired position 203 and an error signal 206 is generated. The error signal 206 is used to drive voice coil motor 67 in a radial direction to position the servo head (and ultimately the read/write head") over the desired location. This scheme is a closed loop scheme since actual position information is provided from the servo head to the position decode block 202 and compared to the desired physical address 203.

A block diagram of the positioning circuitry of the disk drive of the present invention in floppy disk drive mode is illustrated in FIG. 5B. When the host computer is communicating with the floppy drive interface, step commands are provided to direct a stepper motor to move in a certain direction a certain number of steps. Prior art floppy disk drives are open loop systems and rely on the accuracy of the stepper motor to position the head over the approximate location of the desired data track. Since the present invention does not utilize a stepper motor, but rather utilizes a voice coil motor, the stepper instructions cannot be used directly to position the heads. Therefore, the step command 210 is provided to a command translator block 211 to generate a destination track location 203. A transducer assembly mounted on the disk drive chassis and the head carriage is used to provide track position information. The transducer assembly 68 provides relative position information signals 212 to position decode block 202. These signals are converted to an actual position signal 204 which is provided to comparator 205 along with the desired track location signal 203. The comparator 205 provides an error signal 206 to voice coil motor 67. This error signal 206 is used to drive the voice coil motor in the appropriate direction and distance to reach the destination track.

In the preferred embodiment of this invention, the position decode block 202, logical and physical conversion block 201 and command translator block 211 are implemented in the control block 101 of FIG. 4.

A detailed block diagram of the preferred embodiment of this invention is illustrated in FIG. 2. The dual interface disk drive of the present invention provides two hardware connectors to a host computer (not shown); namely IDE connector 21 and FDD (floppy disk drive) connector 22. IDE connector 21 communicates with the host computer on lines 23. FDD connector 22 communicates with the host on lines 24, 25 and 26. Lines 24 carries step, status, and WDI information. Line 25 carries MFM (modified frequency modulation) data and index information. A power connector 27 receives power on line 28.

The IDE connector 21 is coupled to an IDE interface block 38. In the preferred embodiment of the present invention, the interface block 38 is implemented with a Cirrus Logic chip number SH 260 AT/XT. This block 38 implements the IDE (PC/AT) interface. Any one of several commercially available interface chips can be utilized in the present invention.

The FDD connector 22 provides step status and WDI information along with MFM data information to an FDD interface block 39. In the preferred embodiment of the present invention, a SONY FDD integrated circuit (Sony CX1362Q) is utilized as an element of the FDD interface. However, there are several suitable commercially available FDD interface chips which can be utilized in the present invention.

Media sensor block 32 is used to identify the disk that is inserted into the disk drive to determine if it is a high capacity disk or a standard floppy disk. The media sensor block 32 provides output signal 33 to digital control block 44. The digital control block 44 controls signal flow in the disk drive based on whether a high capacity floppy or a standard floppy is resident in the disk drive. The power connector 27 provides the input voltage signal 28 to DC/DC converter 29. Converter 29 provides a 5 volt signal 30 and a 12 volt signal 31 as output to the system electronics. A high capacity drive ID block 34 and a standard capacity drive ID block 35 are provided. These ID blocks are used to notify the host computer that two disk drives are available and to assign a specific physical address for each drive via programming jumpers (even though only a single disk drive unit is actually provided). The drive ID blocks 34 and 35 communicate with digital control block 44 on lines 36 and 37 respectively. A crystal 43 provides clocking signals to digital control block 44.

The IDE interface block 38 receives control programming information from the drive PROM (Programable Read Only Memory) 46 on line 40. The RAM (Random Access Memory) 45 is coupled to digital control block 44 through line 55. Static RAM 45 provides high speed temporary storage for use by the digital control block 44 and microprocessor 48. Microprocessor 48 is coupled to the digital control block 44 on line 50. Microprocessor 48 is also coupled to an EEPROM (Electrically Erasable Programable Read Only Memory) 47 on line 49. The microprocessor 48 is also coupled to an analog control block 61 on control line 51. Digital control block 44 is coupled to analog control block 61 on lines 52, 53, and 54. These lines contain transducer clock/control signals, NRZ (none return to zero) data signals and SVO (servo) position/velocity signals, respectively. Analog control block 61 also is coupled to line 64, a 5.6 volt reference line.

Voice coil motor drive control signals are provided on line 62 from the analog control block 61 to the voice coil motor drive power block 63. Digital control block 44 also provides voice coil motor control signals on line 59 to the voice coil motor drive block 63. The voice coil motor drive block 63 provides voice coil drive signal 65 through transducer/voice coil motor connector 66 to voice coil motor 67 to position the read/write heads on the disk drive. Analog control block 61 communicates on line 70 with the transducer/VCM connector block 66. Transducer block 68 provides position information output signal 69 to transducer VCM connector block 66.

Analog control block 61 also provides pre-amp select signal 71 and high capacity analog and servo signal 72 to carriage connector 73. Digital control block 44 provides pre-amp control WDI (write data in) signal 60 to carriage connector block 73. The floppy drive interface block 39 provides the low capacity analog and erase signals 88 to carriage connector 73. The present invention uses multi-core read/write heads to implement the high capacity and standard floppy drive read/write heads. For purposes of convenience however, each core is indicated as a separate data head in FIG. 2. Data head 74 and servo head 75 are the upper data and servo head, while data head 76 and servo head 77 are the lower data and servo heads of the high capacity. Pre-amps 78 and 79 are coupled between the carriage connector 73 and data head 74 and 76 respectively. Pre-amps 78 and 79 provide preamplification of the read and write signals of the high capacity data heads. Pre-amps 78 and 79 are coupled to carriage connector 73 on lines 82 and 84 respectively. Servo heads 75 and 77 are coupled to carriage connector 73 through lines 83 and 85 respectively. Low capacity heads 80 and 81 are coupled to the carriage connector 73 on lines 86 and 87 respectively.

Step, status, and WDI signals 24 are coupled to digital control block 44. Index signal 26 is coupled to digital control block 44 and to motor control block 89. Digital control block 44 provides a motor control signal 58 to motor control block 89 to control the speed of the spindle motor 93. The motor control block 89 provides a speed signal 90 to the spindle motor 93 along with a power signal 91. An index signal 92 is read from the spindle motor 93 and provided to motor control block 89.

The digital control block 44 acts as an arbitrator to enable the correct data path depending upon the desired operation of the disk drive. The digital control block 44 receives information from the media sensors block 32 and thereby identifies the type of disk inserted into the disk drive. The digital control block 44 includes a clock divider, so that the appropriate motor control clock cart be provided to the motor control block 89. If a high capacity disk is resident in the disk drive, the digital control block 44 provides a higher frequency motor control clock signal 58 to the motor control block 89 so that the spindle motor is rotated at a higher rate. If a standard floppy disk drive is resident in the disk drive, a lower frequency motor control clock signal 58 is provided.

HIGH CAPACITY OPERATION

When the disk drive of the present invention is in high-capacity disk drive mode, the digital control block 44 selects signals from the appropriate cores (74, 75, 76, 77) of the multi-core head in FIG. 2. In the IDE interface, the host computer writes to and reads from logical addresses. Therefore, the digital control block 44, in conjunction with the microprocessor 48 converts logical addresses to physical addresses. The microprocessor 48 then generates positioning signals that are provided through the digital control block and analog control block to the voice coil motor, so that the read/write heads can be positioned over the desired track and sectors. Servo information from the servo heads is provided to the digital control block and the microprocessor in a feedback loop so that accurate positioning may be maintained. The digital control block 44 also provides the proper motor frequency clock signal 58, so the spindle motor rotates at 720 RPM.

STANDARD FLOPPY DRIVE OPERATION

When a standard floppy disk is resident in the disk drive, the digital control block enables the standard floppy cores on the multi-core head, identified as upper head 80 and lower head 81 in FIG. 2. The digital control block 44 provides, the proper motor frequency clock signal 58, so that the spindle motor rotates at 300 RPM. Position information 24 (step/status) is provided to the digital control block for translation into track position information. Signals from the transducer are used to provide track position information which is compared to the destination location so that head positioning may be achieved by using a voice coil motor. Decoding of data in the standard floppy drive mode is accomplished by the host computer. Therefore, the data path for floppy operation is through the FDD connector 22 and through the FDD interface block 39 and through the carriage connector 73 to the read/write heads 80 and 81.

Thus, a dual interface disk drive that can read from and write to both low capacity and high capacity disks has been described.

We claim:

1. A disk drive for reading and writing user data from first and second types of removable disk and reading servo information data only from said second type of removable disk comprising:

a magnetic read/write head assembly having a first core for reading and writing user data on said first type of removable disk, and a second core for reading and writing user data on said second type of removable disk;

a first user path, connected to said first core, for transferring user data to and from said first core;

a second user path, connected to said second core, for transferring user data to and from said second core, said second user path being separate and distinct from said first user data path;

identifying means for identifying said removable disk as being said first or said second type;

control means coupled to said identifying means for selecting said first user data path only when said first type of removable disk is identified and for selecting said second user data path only when said second type of disk is identified;

a first interface, separately coupled to both said control means and said first user data path, for communicating between said first user data path and a host computer only when said first type of removable disk is resident in said disk drive;

a second interface, separately coupled to both said control means and said second user data path, for communicating between said second user data path and a host computer only when said second type of removable disk is resident in said disk drive, said second interface being a different type than said first interface and being separate and distinct from said first interface.

2. The disk drive of claims 1 wherein said first type of removable disk comprises a standard floppy disk.

3. The disk drive of claim 1 wherein said second type of removable disk comprises a high capacity floppy disk.

4. The disk drive of claim 1 wherein said identifying means comprises a media sensor that detects the presence and absence of openings on said removable disk.

5. The disk drive of claim 1 further comprising motor means coupled to said control means for rotating said removable disk at a first rate when said removable disk is of said first type and at a second rate when said removable disk is of said second type.

6. The disk drive of claim 5 wherein said first rate comprises 300 RPM.

7. The disk drive of claim 5 wherein said second rate comprises 720 RPM.

8. The disk drive of claim 1 further comprising positioning means coupled to said read/write head assembly for positioning said read/write head assembly with respect to a surface of said removable disk.

9. The disk drive of claim 8 wherein said positioning means receives position information from a transducer assembly when said first type of removable disk is resident in said disk drive.

10. The disk drive of claim 8 wherein said positioning means receives servo information data from said read/write head assembly when said second type of removable drive is in said disk drive.

11. The disk drive of claim 8 wherein said positioning means comprises a voice coil motor for positioning said read/write head assembly.

12. The disk drive of claim 1 wherein said read/write head assembly comprises a third core for reading servo information data on said second type of removable disk.

13. The disk drive of claim 1 wherein said first interface comprises a floppy disk drive interface.

14. The disk drive of claim 1 wherein said second interface comprises an IDE (Integrated Device Electronics) interface.

* * * * *